United States Patent
Kumar et al.

(10) Patent No.: US 12,445,157 B2
(45) Date of Patent: Oct. 14, 2025

(54) SYSTEM AND DESIGN METHOD OF A 5G NR COMBINED CENTRALIZED AND DISTRIBUTED UNIT

(71) Applicant: JIO PLATFORMS LIMITED, Ahmedabad (IN)

(72) Inventors: Narender Kumar, South Delhi (IN); Shakti Singh, Gurgaon (IN); Amrish Bansal, Navi Mumbai (IN); Brijesh Shah, Navi Mumbai (IN); Bajinder Pal Singh, Janakpuri (IN); Selvakumar Ganesan, Tirupur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,476

(22) PCT Filed: Mar. 24, 2023

(86) PCT No.: PCT/IB2023/052917
§ 371 (c)(1),
(2) Date: Mar. 31, 2023

(87) PCT Pub. No.: WO2023/187568
PCT Pub. Date: Oct. 5, 2023

(65) Prior Publication Data
US 2025/0055491 A1    Feb. 13, 2025

(30) Foreign Application Priority Data
Mar. 31, 2022    (IN) .............................. 202221019334

(51) Int. Cl.
*G06F 11/30*    (2006.01)
*G06F 11/16*    (2006.01)
(Continued)

(52) U.S. Cl.
CPC ............. *H04B 1/1607* (2013.01); *H04B 1/40* (2013.01); *H04L 1/004* (2013.01); *H04W 88/08* (2013.01)

(58) Field of Classification Search
None
See application file for complete search history.

(56) References Cited

U.S. PATENT DOCUMENTS 11,088,744 B1 * 8/2021 Hammond .......... H04W 56/001
2018/0376380 A1 * 12/2018 Leroux ................... H04W 4/70
(Continued)

FOREIGN PATENT DOCUMENTS

WO    WO-2018089803 A1 *  5/2018 ............ H04W 36/38
WO       2019194737 A1    10/2019
(Continued)

OTHER PUBLICATIONS

International Search Report, PCT/IB2023/052917, mailed Jul. 12, 2023, Total p. 04.

*Primary Examiner* — Mohammed Rachedine
(74) *Attorney, Agent, or Firm* — FINNEGAN, HENDERSON FARABOW, GARRETT & DUNNER LLP.

(57) ABSTRACT

The present invention provides an efficient hardware architecture for an ORAN compliant internal structure of a gnodeB (gNodeB) comprising of a combined centralized unit and a distributed unit (CCDU) for a 5G basement application required for processing Level 1, 2 and 3 scheduling in a network. The CCDU design may provide the functionality of a CU and a DU with single unit and can operate over wide temperature range. A single board approach of the CCDU make the CCDU more reliable and less costly. The CCDU can support different kinds of syn-
(Continued)

chronization and can provide site alarms over dry contacts to equip with external alarm device.

13 Claims, 5 Drawing Sheets

(51) Int. Cl.
*G06F 11/3698* (2025.01)
*H04B 1/16* (2006.01)
*H04B 1/40* (2015.01)
*H04L 1/00* (2006.01)
*H04W 24/04* (2009.01)
*H04W 88/08* (2009.01)
*H04W 92/20* (2009.01)

(56) References Cited

U.S. PATENT DOCUMENTS

| | | | |
|---|---|---|---|
| 2020/0296696 A1* | 9/2020 | Goldhamer | H04W 4/40 |
| 2021/0127430 A1* | 4/2021 | Teyeb | H04L 67/141 |
| 2021/0243613 A1* | 8/2021 | Khanfouci | H04L 41/0895 |
| 2023/0036797 A1 | 2/2023 | Xu et al. | |
| 2023/0036904 A1* | 2/2023 | Thommana | H04W 40/02 |
| 2023/0309037 A1 | 9/2023 | Zou et al. | |

FOREIGN PATENT DOCUMENTS

| | | | | |
|---|---|---|---|---|
| WO | WO-2021020414 A1 * | 2/2021 | | H04W 72/566 |
| WO | 2021208751 A1 | 10/2021 | | |
| WO | 2022023556 A1 | 2/2022 | | |
| WO | WO-2022158907 A1 * | 7/2022 | | H04W 76/20 |

* cited by examiner

SYSTEM AND DESIGN METHOD OF A 5G NR COMBINED CENTRALIZED AND DISTRIBUTED UNIT

FIELD OF INVENTION

The embodiments of the present disclosure generally relate to telecommunication basement application. More particularly, the present disclosure relates to design of a combined centralized and distributed unit (CCDU).

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The fifth generation (5G) technology is expected to fundamentally transform the role that telecommunications technology plays in the industry and society at large. A gNodeB is a 3GPP-compliant implementation of a 5G-NR base station. It consists of independent Network Functions, which implement 3GPP-compliant NR Radio access network (RAN) protocols namely: physical layer (PHY), media access control layer (MAC), radio link control (RLC), Packet Data Convergence Protocol (PDCP), service data adaptation protocol (SDAP), radio resource control (RRC), Network Real-time Analysis Platform (NRAP). The gNB further incorporates three functional modules: the CU, the DU and the Radio Unit (RU), which can be deployed in multiple combinations. They can run together or independently and can be deployed on either physical (e.g. a small cell chipset) or virtual resources (e.g. dedicated COTS server or shared cloud resources). The CU provides support for the higher layers of the protocol stack such as SDAP, PDCP and RRC while the DU provides support for the lower layers of the protocol stack such as radio link control (RLC), media access control (MAC) and Physical layer. In a 5G radio access network (RAN) architecture, the DU in the baseband unit (BBU) is responsible for real time Layer 1 and Layer 2 scheduling functions of the 5G protocol stack layer and the CU is responsible for non-real time, higher L2 and L3 of the 5G protocol stack layer.

However, in existing architecture the DU and the CU units are physically separate and require exhaustive and complex methodologies and protocol support for the splitting of the gNB into the DU and CU. Splitting of CU and DU is the most outstanding in the gNB internal structure and these two entities are connected by a new interface called F1. In most existing gNB nodes, CU and DU are physically separate, that is, the CU and DU are on separate boards and hence the splitting becomes more expensive in terms of realization of temperature requirement, vibration, dust, humidity, latency, power, radiation loss, bandwidth, more dependence on possible interfaces and maintaining the parameters for both the CU and DU separately.

Hence, there is a need in the art to provide for a compact CCDU that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide a system in a single unit to reduce cost and increase reliability.

An object of the present disclosure is to design a Hardware is that is on a single PCB approach by keeping all required SoC on board.

An object of the present disclosure is to provide a system that can operate over Wide temperature range.

An object of the present disclosure is to provide system that supports for synchronization required such as GPS, PTP and holdover.

An object of the present disclosure is to provide a system that facilitates site alarms over dry contacts to equip with external alarm device.

An object of the present invention is to perform functionalities of CU and DU by an integrated device.

Yet another objective of the invention is to reduce the external interfaces, and thereby saving the cost and reducing the impact of foreign particles.

An object of the present disclosure is to provide a system that operates at standard telecom power supply (−48 VDC) with all required protection for telecom sites.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention providesa combined centralized and distributed unit (CCDU) system. The system may include a single integrated board and the single integrated board may further include a network enabled controller; a clock synchronizer module; a radio unit communicatively coupled to a network); a centralized unit (CU) configured to perform functionalities associated with higher layers of a network protocol stack; a distributed unit (DU) configured to perform functionalities associated with lower layers of the protocol stack; a processing unit, operatively coupled to a memory, the memory storing instructions which when executed by the processing unit causes the system to: perform a set of functionalities associated with the CU and the DU, wherein the network enabled controller, and the clock synchronizer module provide control and synchronizing signals respectively to the processing unit such that the CU and the DU functions from the single integrated board and communicates with the radio unit as a single CCDU unit.

In an embodiment, the CCDU may include one or more network interfaces to communicate with the radio unit (RU) and a backhaul network.

In an embodiment, the CCDU comprisesan accelerator unit that further comprises a Soft-Decision Forward Error Correction (SD-FEC) module (116).

In an embodiment the CCDU further comprises interfaces for one or more data input and output devices, one or more storage devices, and facilitate communication of the CCDU with a plurality of platforms such as a platform controller hub and an ASIC.

In an embodiment, the CCDU further may includea thermal management module to operate over a predefined temperature range and a predefined environment condition.

In an embodiment, one or more components in the single integrated board may be arranged in predefined number of layers in a printed circuit board (PCB) such that the system is not bulky and heavy, wherein the one or more components support the functionality of the CCDU as a single unit in the single integrated board.

In an embodiment, the one or more network interfaces may include a plurality of Fiber Optic (SFP) as a fronthaul connection to the RU and two or more Fiber Optic (SFP) as a backhaul connection to the backhaul network.

In an embodiment, the thermal manage module may be further coupled to one or more alarm devices configured to send alarm signals over dry contacts, temperature rise, critical environment conditions and critical electronic conditions.

In an embodiment, the processing unit may include a base boardmanagement controller (BMC), the Local area Network controllers and the clock synchronizer module.

In an embodiment, a plurality of dynamic random-access memory integrated circuits or modules interfaces may be embedded in the single integrated board, wherein a plurality of DDR4 are connected with the single integrated circuit.

In an embodiment, the one or more interfaces such as Ethernet, USB/UART may be connected with the processing unit through the platform controller Hub (PCH) associated with the single integrated board.

In order to achieve the aforementioned objectives, the present invention provides a method to perform a set of functionalities associated with the CU and the DU, by the combined centralized and distributed unit (CCDU) system.

In an aspect, the present disclosure relates to a non-transitory computer readable medium including processor-executable instructions that cause a processor to perform a set of functionalities associated with the CU and the DU, by the combined centralized and distributed unit (CCDU) system. The functionalities may be associated with higher layers of a network protocol stack, and the functionalities associated with lower layers of the protocol stack.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of cach component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

Further, a protocol stack or network stack is an implementation of a computer networking protocol suite or protocol family for a telecommunication system consisting of a plurality of network devices. A 5G protocol stack may include layer-1 (L1) which is a PHYSICAL Layer. The 5G layer-2 (L2) may include MAC, RLC and PDCP. The 5G layer-3 (L3) is the RRC layer.

The present invention provides an efficient hardware architecture for an ORAN compliant internal structure of a base station or a next generation node B (gNodeB) comprising of a combined centralized unit and a distributed unit (CCDU) for a 5G basement application required for processing L1, L2 and L3 scheduling of the network. The CCDU design may provide the functionality of a CU and a DU with single unit and can operate over wide temperature range. A single board approach of the CCDU make the CCDU more reliable and less costly. The CCDU can support different kinds of synchronization and can provide site alarms over dry contacts to equip with external alarm device. In this description, numerous specific details such as logic implementations, types and interrelationships of system components, etc., may be set forth in order to provide a more thorough understanding of some embodiments. The Combined Centralized and Distributed Unit (CCDU) board may be configured to handle and processRRC/PDCP/RLC/MAC and higher PHY functions.

It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

Figure 1A:
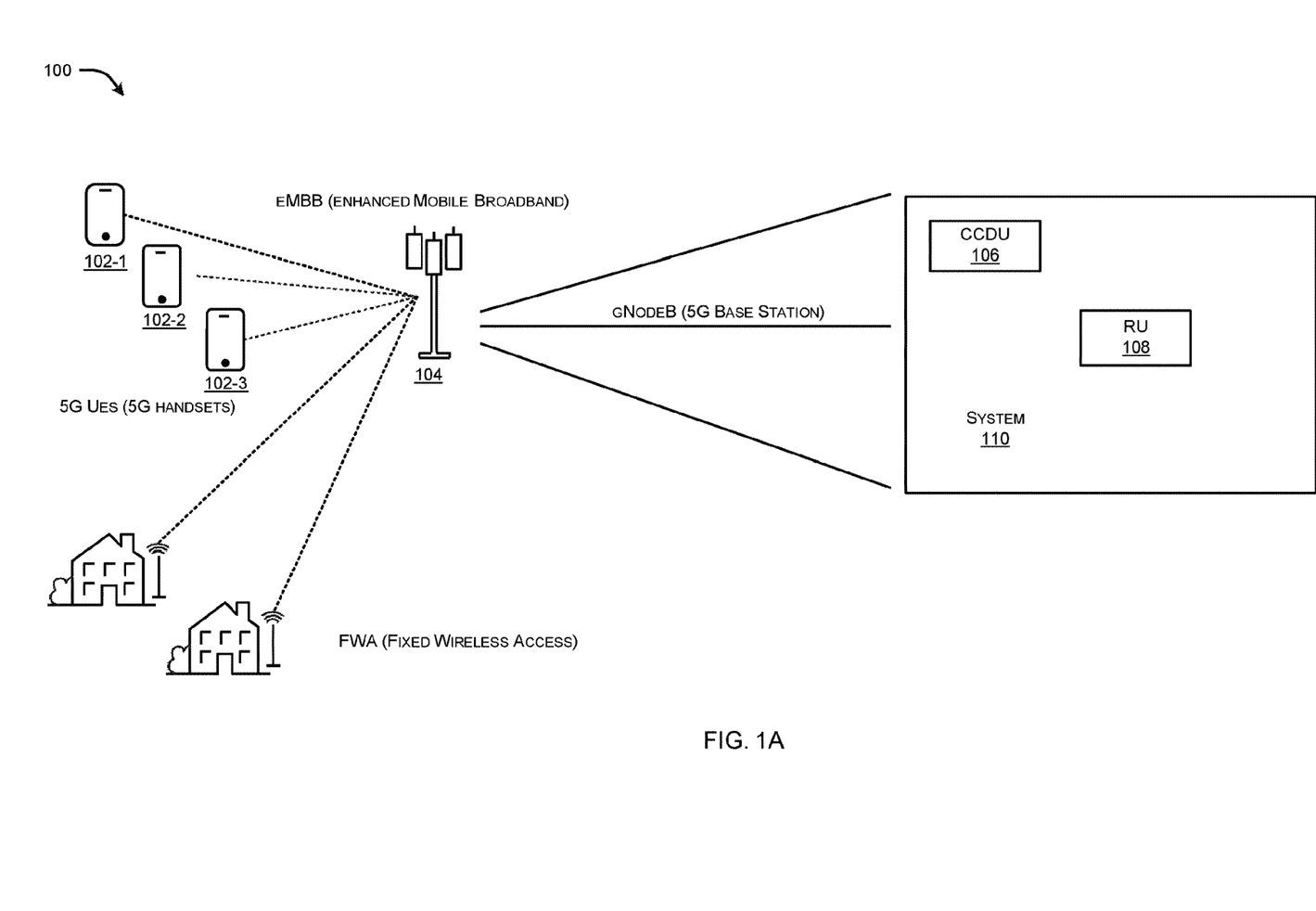
FIG. 1A illustrates an exemplary network architecture in which or with which proposed system of the present disclosure can be implemented, in accordance with an embodiment of the present disclosure.

Referring to FIG. 1A that illustrates an exemplary network architecture for a 5G New radio (NR) network (100) (also referred to as network architecture (100)) in which or with which the proposed system (110) can be implemented, in accordance with an embodiment of the present disclosure. As illustrated, the exemplary network architecture (100) may be equipped with the proposed system (110) that may be associated with a 5G base station (104) (also referred to as gNodeB (104)). The gNodeB (104) may include at least three functional modules such as a centralized unit (CU), a distributed unit (DU) and a radio unit (RU). The gNodeB may be communicatively coupled to a plurality of first computing devices (102-1, 102-2, 102-3 . . . 102-N) (interchangeably referred to as user equipment (102-1, 102-2, 102-3 . . . 102-N) and (individually referred to as the user equipment (UE) (124) and collectively referred to as the UE (102)) via an Open radio access network Radio Unit (O-RU) (114).

Figure 1B:
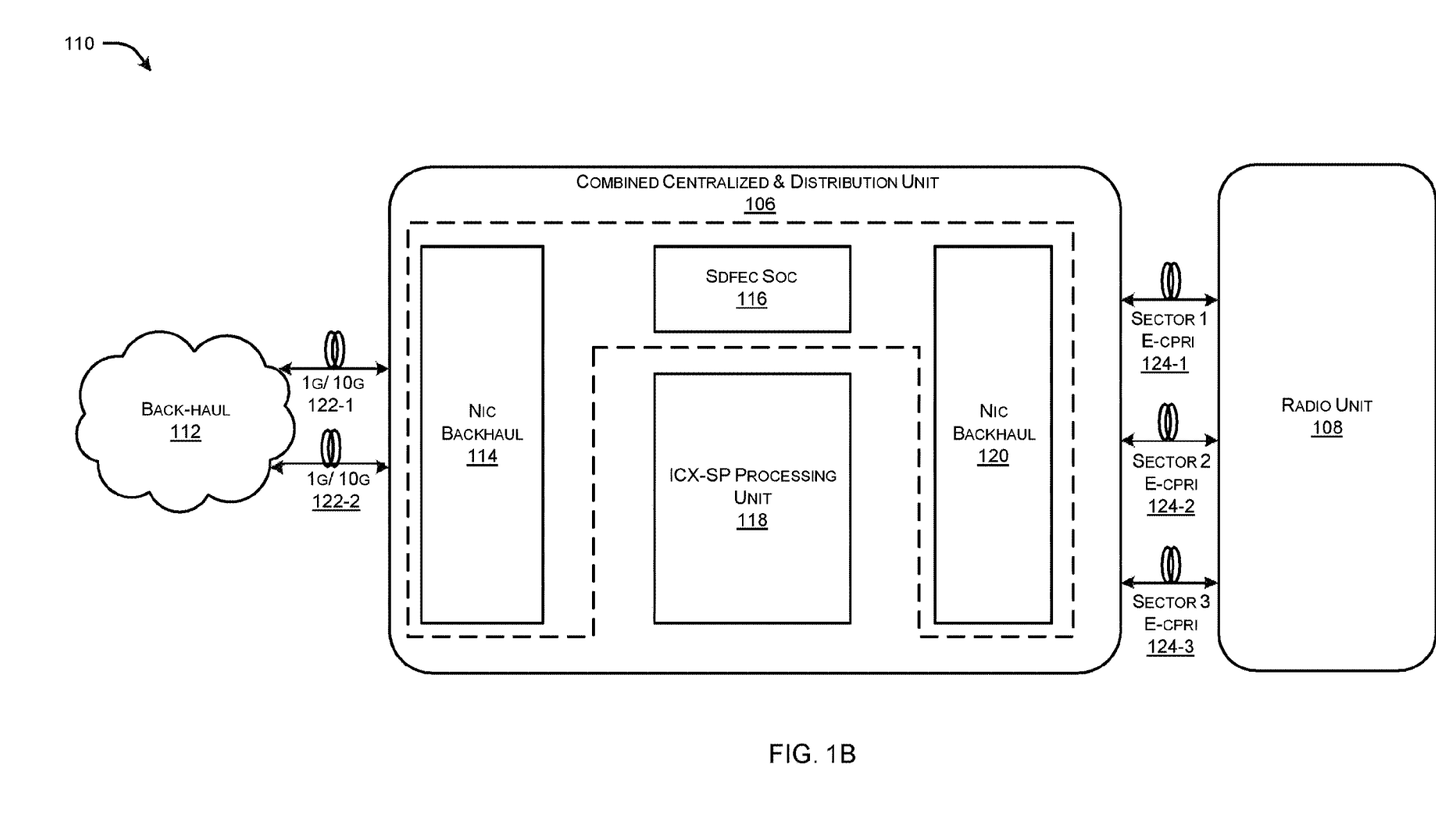
FIG. 1B illustrates an exemplary system architecture of the combined centralized and distributed unit (CCDU), in accordance with an embodiment of the present disclosure.

In an exemplary embodiment, the system (110) may be configured with a combined CU and DU in a single platform or PCB and is simply referred to as CCDU (106) as illustrated in FIG. 1B. The CCDU (106) may be operatively coupled to a radio unit (RU) (108) via one or more Network interface card (NIC) cards such as a backhaul Network interface card (NIC) (114), a fronthaul NIC (116), and the like. The CCDU (106) may include a processing unit (118), an accelerator unit that may include a Soft-Decision Forward Error Correction (SD-FEC) module (116), a local area network controller unit comprising the backhaul Network interface card (NIC) (114), the fronthaul NIC (116), and the like. The backhaul NIC (114) may be further communicatively coupled to a backhaul network (112). The CU provides support for the higher layers of the protocol stack such as SDAP, PDCP and RRC while DU provides support for the lower layers of the protocol stack such as RLC, MAC and Physical layer. A single CU for each gNB, but one CU controls multiple DUs. Each DU is able to support one or more cells, so one gNB can control hundreds of cells.

Figure 2:
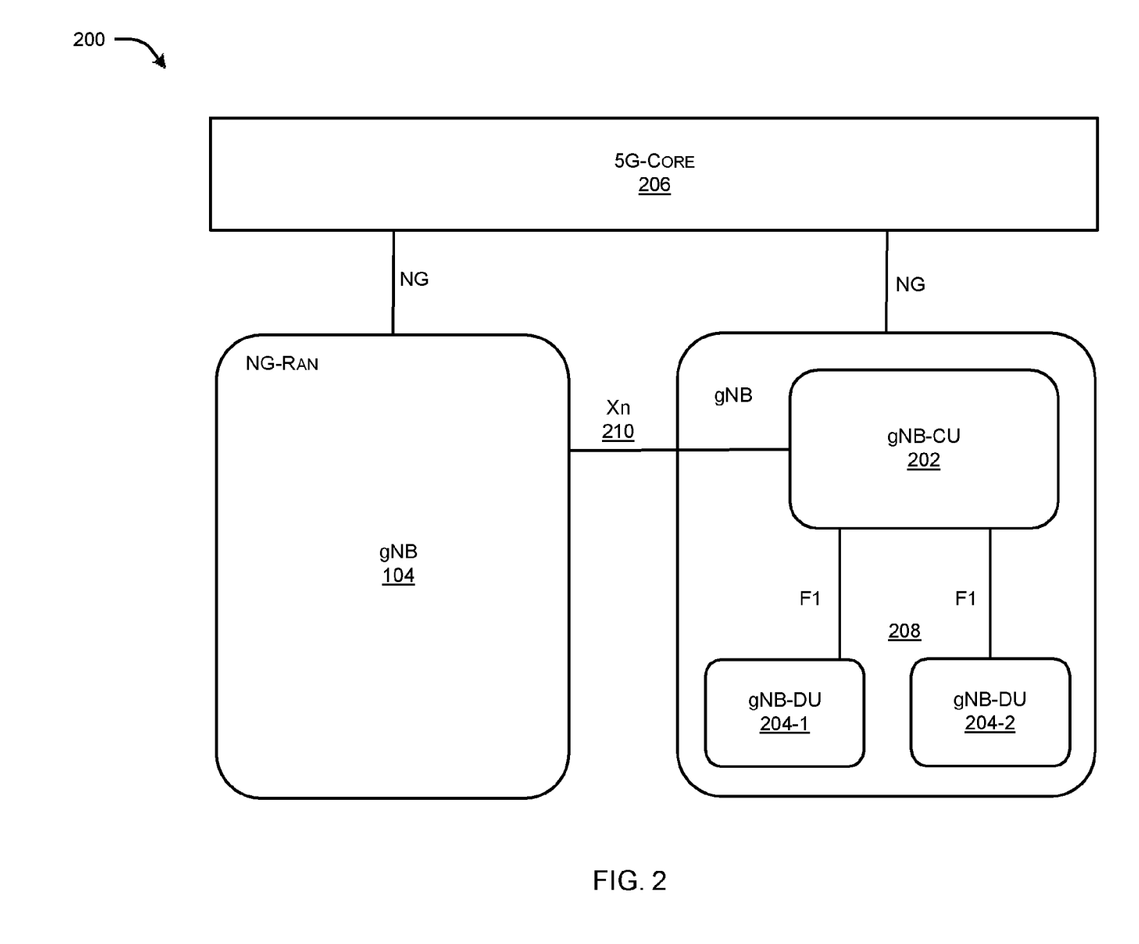
FIG. 2 illustrates an exemplary existing representation of a Centralized unit and a distributed unit of a gNodeB.

Generally, an existing gNodeB internal structure (200) for a 5G core (206) is shown in FIG. 2 where it can be quite clear to a person not skilled in the art that the existing CU (202) and DU (204) are separate units connected by an F1 interface (208).

Figure 3:
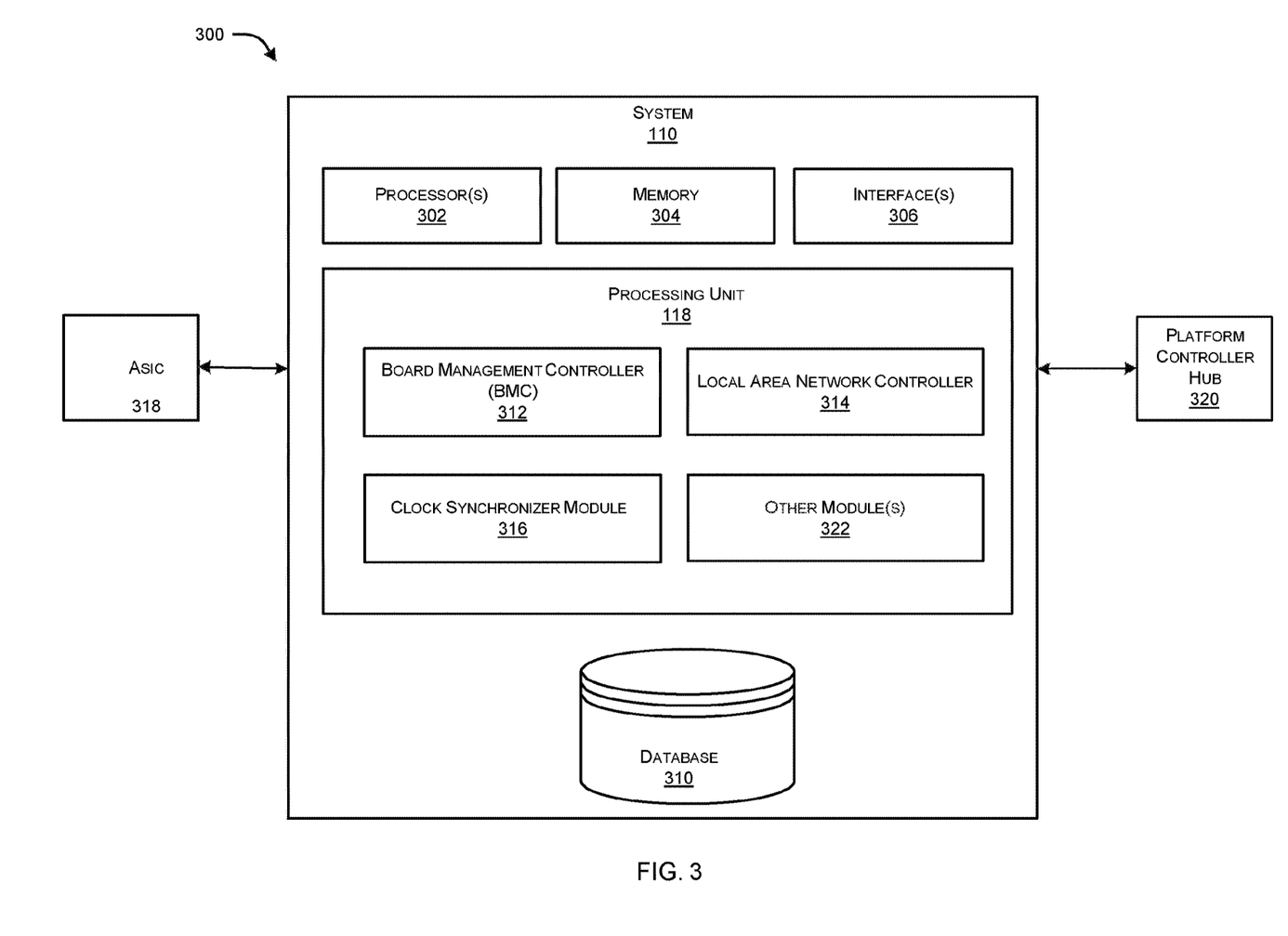
FIG. 3 illustrates an exemplary processing unit diagram of the CCDU, in accordance with an embodiment of the present disclosure.

In an exemplary embodiment, as illustrated in FIG. 3, the system (110) or the CCDU (106) may include one or more processors coupled with a memory, wherein the memory may store instructions which when executed by the one or more processors may cause system (110) to perform L1 and L2 functionalities. The one or more processor(s) (302) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (302) may be configured to fetch and execute computer-readable instructions stored in a memory of the CCDU (106). The memory may be configured to store one or more computer-readable instructions or routines in a non-transitory computer-readable storage medium, which may be fetched and executed to create or share data packets over a network service. The memory (304) may comprise any non-transitory storage device including, for example, volatile memory such as RAM, or non-volatile memory such as EPROM, flash memory, and the like.

In an embodiment, the system (110) may include a plurality of interfaces (306). The interfaces (306) may comprise a variety of interfaces, for example, interfaces for data input and output devices, referred to as I/O devices, storage devices, and the like. The interfaces (306) may facilitate communication of the system (110) with a plurality of platforms such as a platform controller hub (320) and an ASIC (318) comprising of (System on Chip) SoC components associated with the functioning of CCDU (106). In an exemplary embodiment, the SoC may include but not limited to the Soft-Decision Forward Error Correction (SD-FEC) module (116). The interface(s) (306) may also provide a communication pathway for one or more components of the CCDU (106). Examples of such components include, but are not limited to, processing unit/engine(s) (118) and a database (310).

In an exemplary embodiment, the CCDU (106) may be provided with a thermal management module that may be designed for an outdoor application to operate over a predefined temperature range and a predefined environment condition unlike COTS (Commercial of the shelfs) servers which are used in AC environment. For example, the predefined temperature range may go be from 0° to at least 60° C. in desert and other tropical and equatorial areas while predefined environment condition may include dry, humid, cold or dusty environment.

In an exemplary embodiment, the CCDU in the single board can have a chip down approach wherein one or more components corresponding to the NIC cards may be part of the single board that increases the mean time between failures (MTBF) that leads to increased system reliability and availability reduces the costs significantly. Since, the components are all combined in a single board hence separate components (cards) may not be required rather a single board may be used which will reduce not only the process of manufacturing but also will reduce the cost and increase the system reliability. Furthermore, CCDU is an integrated solution of Centralized Unit (CU) and Distributed Unit (DU) for 5G Network, which is nominal power consuming device that operates on less than 400 W. The disclosed Combined Centralized and Distributed Unit (CCDU) design is very compact and may be easily installed in Tower sites server racks. It may be further quick to deploy and delivers high performance with low power consumption.

In an exemplary embodiment, the system (110) may be assembled in a single board (interchangeably referred to as LAN on motherboard (LOM)) having a predefined number of layers of a printed circuit board (PCB). The predefined number of layers ensure that the system is not bulky and heavy. In a way of example but not limitation, the predefined number of layers can be at least 14. In an example the system (110) may include one or more network connections directly connected to the LOM. Instead of requiring a separate network interface card to access a local-area network, such as Ethernet, the circuits may be attached to the single board. An advantage of the system (110) can be an extra available peripheral component interconnect (PCI) slot that is not being used by a network adapter.

In an exemplary embodiment, the system (110) may include at least Four (×4) 25G Fiber Optic (SFP) but not limited to it as a fronthaul connection to the fronthaul NIC (116) on but not limited to an eCPRI protocol and at least two (×2) 10G Fiber Optic (SFP) as a backhaul connection to the backhaul network (112).

In an exemplary embodiment, the system (110) may be further coupled to one or more alarm devices (not shown in the FIG. 1B) that may send alarm signals over dry contacts, temperature rise, critical environment conditions and critical electronic conditions. The system (110) may operate in a standard telecom power supply of −48 VDC but not limited to it with all required protection for telecom sites.

Processing Unit

The processing unit/engine(s) (118) may be implemented as a combination of hardware and programming (for example, programmable instructions) to implement one or more functionalities of the processing unit (118). In the examples described herein, such combinations of hardware and programming may be implemented in several different ways. For example, the programming for the processing unit (118) may be processor-executable instructions stored on a non-transitory machine-readable storage medium and the hardware for the processing unit (118) may comprise a processing resource (for example, one or more processors), to execute such instructions. In the present examples, the machine-readable storage medium may store instructions that, when executed by the processing resource, implement the processing unit (118). In accordance with such examples, the system (110) may include the machine-readable storage medium storing the instructions and the processing resource to execute the instructions, or the machine-readable storage medium may be separate but accessible to the CCDU (106) and the processing resource. In other examples, the processing engine(s) (118) may be implemented by electronic circuitry.

The processing unit (118) may include one or more modules/engines selected from any of a base board management controller (BMC) (312), Network enabled controllers (314) (interchangeably referred to as the Ethernet controllers (314) herein), a clock synchronizer module (316), and other module(s) (322). In an example, the processing unit may be but not limited to a 32 core processing engine. The memory (204) may include but not limited to a 256 GB random access memory (RAM).

In an exemplary embodiment, the CCDU (106) may be configured to functionally split the CU and DU. In an exemplary embodiment, the processing unit (118) may cause the Distributed unit (DU) (106-2) to perform real time L1 and L2 scheduling functions and the like based on a predefined set of instructions associated with the gNodeB (104). In another embodiment the processing unit (118) may cause the Centralised unit (DU) (106-1) to perform non-real time, higher L2 and L3 Layers scheduling functions and the like based on the predefined set of instructions associated with the gNodeB (104). The CU (106-1) may further be configured to control the functionalities of the DU.

In an exemplary embodiment, the processor unit (118) may be scalable and may be provided with the Platform controller Hub (PCH) (320) to expand the input/outputs (I/Os) and the PCH (320) may be further interfaced with but not limited to a second interface such as a direct media interface (DMI) or a peripheral component interconnect (PCIe) or a Genx4 interface with the processor unit (118) and provide an interface to serial peripheral interface (SPI) flash for basic input output system (BIOS), PCIe and serial AT attachment (SATA) for solid state drives (SSD).

In an exemplary embodiment the BMC (312) may be used for the board management functionality that can provide an Ethernet port for remote monitoring of the processing unit (118). The BMC (312) may be operatively coupled with the PCH (320) through any of a low pin count (LPC), a USB and a PCIe.

Local Area Network Controller

In an exemplary embodiment, the local area network or the Ethernet Controller (314) may be provided for the fronthaul NIC (116) connectivity with the RU (108) and the backhaul NIC may be provided as a connectivity to the backhaul network (112).

In an exemplary embodiment, the Fronthaul NIC (116) may be associated with at least three 25 Gbps interface under evolved Common Public Radio Interface (eCPRI) protocol with the Radio unit (108) and may include an built-in synchronization block such as IEEE1588 block to perform any or a combination of enhanced Common Public Radio Interface (cCPRI) and ORAN functionality but not limited to the like.

In an exemplary embodiment, the Backhaul NIC (114) may provide connectivity with at least but not limited to two 1G/10 Gbps optical Ethernet. The backhaul NIC (114) may further include a synchronization block such as but not limited to IEEE1588 block. In an example, the synchronization block may be configured to recover 1588 Clock from the backhaul network (112). In an exemplary embodiment, the fronthaul NIC (116) and the backhaul NIC (114) may be embedded in the single PCB board.

In an embodiment, a backhaul connectivity for the Backhaul NIC may be provided with a, but not limited to, 1×10 Gbps optical Ethernet.

Asic

The enhanced ASIC (318) may include the accelerator unit. The accelerator unit may further include the Soft-Decision Forward Error Correction (SD-FEC) module (116) and may be one of the components of the Ethernet controller (314). In an example, the SD-FEC module (116) can support Low Density Parity Check (LDPC) decoding and encoding and Turbo code decoding. The LDPC codes used are highly configurable, and the specific code used can be specified on a codeword-by-codeword basis. The SD-FEC module (116) forms the basis of 5G network communication and hence the eASIC must be embedded accurately and correctly with the Ethernet controllers to support working of the CCDU in the single PCB board.

In an embodiment, the SD-FEC module (116) may be embedded as a part of the Ethernet controller to facilitate assembly of the CCDU in the single PCB board.

Further, in an exemplary embodiment, at least eight dynamic random-access memory integrated circuits or modules such as but not limited to Double Data Rate Fourth Generation (DDR4) dual in line memory modules (DIMM) interfaces may be embedded in the eASIC (314). In an example, the DDR4 DIMM may be connected with the processing unit (118) and at least five 1 GB DDR4 may be connected with the eASIC (318). In an exemplary embodiment, other interfaces such as the Ethernet, USB/UART may be connected with the processing unit (118) through the platform controller Hub (PCH) (320) associated with the eASIC (314).

Clock Synchronizer Module

The clock synchronizer module (316) may include a clock synchroniser that may support a Boundary clock (BC) with synchronization blocks such as but not limited to IEEE 1588 and one or more precision timing protocol (PTP) engines, having a global positioning system (GPS) as a primary source of clocking that should support hold over of 24 hrs. The one or more PTP engines can be the secondary source of synchronization and may automatically activate in the absence of the GPS. In an exemplary embodiment, a GPS Holdover may activate in the absence of both the GPS and the one or more PTP. In an embodiment, the clock synchronizer module may be configured to take decision in enabling a priority of synchronization and do not required any manual intervention.

In an exemplary embodiment, the clock synchronizer module (316) can synchronize the system (110) within the single board and further can synchronize external components associated with the system (110) using a clock and synchronization circuit on board. In an exemplary embodiment, the clock and synchronization circuit on board may include an Ultra-low noise clock generation phase locked loops (PLLs), a Programmable oscillator and a System Synchronizer.

In an exemplary embodiment, the clock synchronizer module (316) may further handle holdover requirement as per telecom standards.

In an exemplary embodiment, a communication network may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In an embodiment, the one or more user equipments (102) may communicate with the system (110) via set of executable instructions residing on any operating system. In an embodiment, the one or more user equipments (102) and the one or more mobile devices may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the one or more user equipments (102), and the one or more mobile devices may not be restricted to the mentioned devices and various other devices may be used. A smart computing device may be one of the appropriate systems for storing data and other private/sensitive information.

Thermal Management Module

In an exemplary embodiment, the system (110) may be designed in an optimized way bearing thermal constraints in mind. Thermal management module may include one or mode thermal management techniques such as Liquid cooling, PCB materials, Vapour-chamber cooling, Heat-sink principles, Gallium Nitride (GaN), radio-over-fibre (RoF).

In an exemplary embodiment, the thermal management module can enable the CCDU (106)/system (110) to function in a predefined temperature range of 0 to 60° C. but not limited to it and also withstand extreme climatic conditions and surrounding environmental conditions.

In an exemplary embodiment, the thermal management module may be operatively coupled with an alarm device that may send alarm signals over dry contacts, temperature rise, critical environment conditions and critical electronic conditions. The system (110) may operate in a standard telecom power supply of −48 VDC but not limited to it with all required protection for telecom sites.

In an embodiment, the processing unit (118), the local area network or the Ethernet Controller (314), the enhanced ASIC (318), the clock synchronizer module (316), the thermal management moduleand other modules may be communicatively coupled to perform one or more task associated with the CCDU. Additionally due to the combined CCDU, the functionalities associated with the CU and DU may be performed at a higher performance, with reduced processing time. Furthermore, the processing unit (118), the local area network or the Ethernet Controller (314), the enhanced ASIC (318), the clock synchronizer module (316), and the thermal management module may be connected in parallel or in serial via any possible communication medium.

Exemplary Computer System 400

Figure 4:
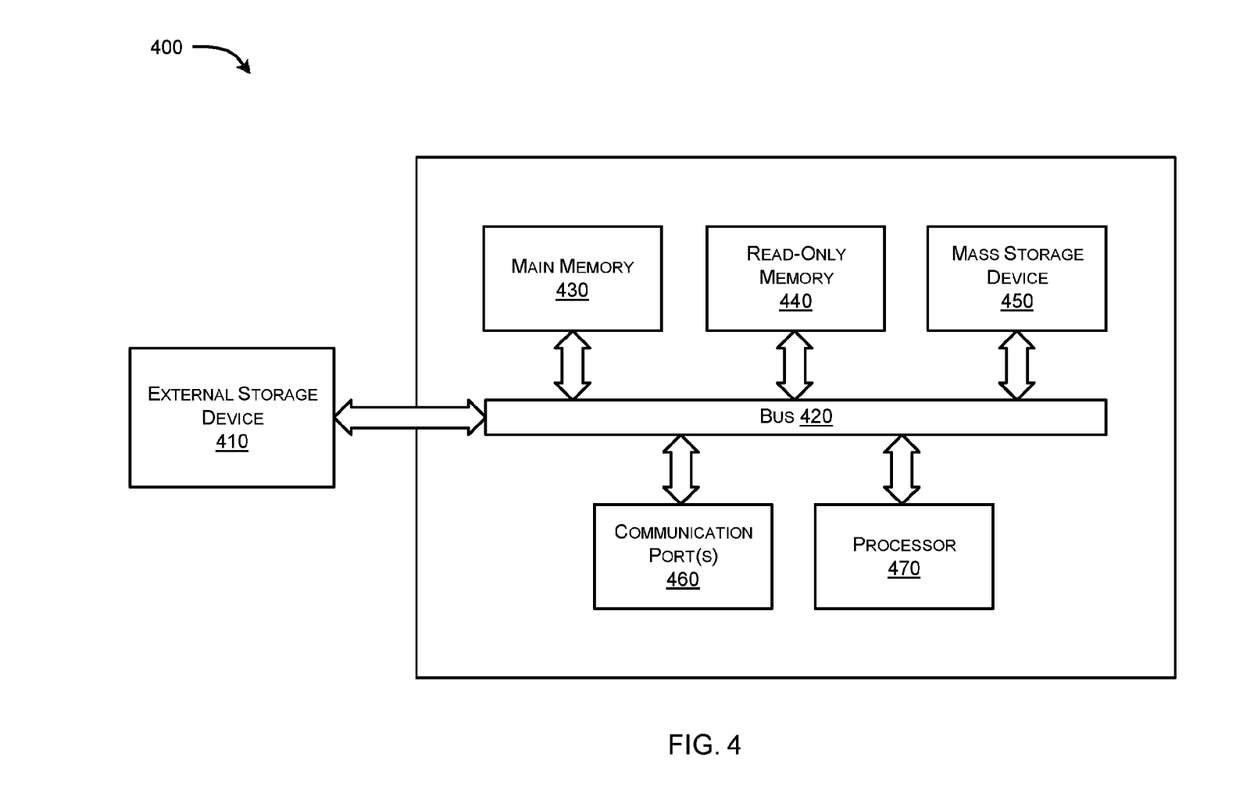
FIG. 4 illustrates an exemplary computer system in which or with which embodiments of the present invention can be utilized in accordance with embodiments of the present disclosure.

FIG. 4 illustrates an exemplary computer system in which or with which embodiments of the present invention can be utilized in accordance with embodiments of the present disclosure. As shown in FIG. 4, computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions.

Bus 420 communicatively couples processor(s) 470 with the other memory, storage and communication blocks. Bus 420 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g. a display, keyboard, and a cursor control device, may also be coupled to bus 420 to support direct operator interaction with a computer system. Other operator and administrative interfaces can be provided through network connections connected through communication port 460. Components described above are meant only to exemplify various possibilities. In no way should the aforementioned exemplary computer system limit the scope of the present disclosure.

In an embodiment, the present invention discloses a method to perform a set of functionalities associated with the CU and the DU, by the combined centralized and distributed unit (CCDU) system. The functionalities may be associated with higher layers of a network protocol stack; and the functionalities associated with lower layers of the protocol stack.

Thus, the present disclosure provides a unique and efficient hardware architecture design of a Combined centralized and Distributed Unit (CCDU) that can provide the functionality of CU and DU with a single box solution. The CCDU is designed for the outdoor application to operate over wide temperature range and different environment condition unlike Commercial of the shelf (COTs) servers which are used in AC environment quiet often. The CCDU have a chip down approach where all the components corresponding to the NIC cards are part of the single board which increases the Mean Time Between Failures (MTBF) and reduces cost significantly.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 38.816 and the like.

ADVANTAGES OF THE PRESENT DISCLOSURE

The present disclosure provides for a system in a single unit to reduce cost and increase reliability.

The present disclosure provides for a Hardware design is that is on a single PCB approach by keeping all required SoC on board.

The present disclosure provides for a system that can operate over Wide temperature range.

The present disclosure provides an integrated unit with reduced number of interfaces.

The present disclosure provides for a system that supports for synchronization required such as GPS, PTP and holdover.

The present disclosure provides for a system that facilitates site alarms over dry contacts to equip with external alarm device.

The present disclosure provides for a system that may be efficient in performance of CU and DU functionalities.

The present disclosure provides for a system that operates at standard telecom power supply (−48 VDC) with all required protection for telecom sites.

The present disclosure provides for a system that may be easily deployed on the server racks.

The present disclosure provides for a system that may be a low power consumption system and thermally handed properly by the IP65 ingress protected mechanical housing.

We claim:

1. A combined centralized and distributed unit (CCDU) system, said system comprising:
   a single integrated board, the single integrated board further comprising:
   a network enabled controller;
   a clock synchronizer module;
   a radio unit (RU) communicatively coupled to a network;
   a centralized unit (CU) configured to perform functionalities associated with higher layers of a network protocol stack;
   a distributed unit (DU) configured to perform functionalities associated with lower layers of the protocol stack;
   a processing unit, operatively coupled to a memory, the memory storing instructions which when executed by the processing unit causes the system to:
   perform a set of functionalities associated with the CU and the DU, wherein the network enabled controller, and the clock synchronizer module, provide control and synchronizing signals respectively, to the processing unit such that the CU and the DU functions from the single integrated board and communicates with the radio unit as a single CCDU unit.

2. The system as claimed in claim 1, wherein the CCDU comprises one or more network interfaces to communicate with the radio unit (RU) and a backhaul network.

3. The system as claimed in claim 1, wherein the CCDU comprises an accelerator unit that further comprises a Soft-Decision Forward Error Correction (SD-FEC) module.

4. The system as claimed in claim 1, wherein the CCDU further comprises interfaces for one or more data input and output devices, one or more storage devices and facilitate communication of the CCDU with a plurality of platforms such as a platform controller hub and an Application-Specific Integrated Circuit (ASIC).

5. The system as claimed in claim 1, wherein the CCDU further comprises a thermal management module to operate over a predefined temperature range and a predefined environment condition.

6. The system as claimed in claim 1, wherein one or more components in the single integrated board are arranged in predefined number of layers such that the system is not bulky and heavy, wherein the one or more components support the functionality of the CCDU as a single unit in the single integrated board.

7. The system as claimed in claim 1, wherein the one or more network interfaces comprises Fiber Optic (SFP) as a fronthaul connection to the RU and a backhaul connection to the backhaul network.

8. The system as claimed in claim 5, wherein the thermal manage module if further coupled to one or more alarm devices configured to send alarm signals over dry contacts, temperature rise, critical environment conditions and critical electronic conditions.

9. The system as claimed on claim 1, wherein the processing unit comprises a base board management controller (BMC), the Local area Network controllers the clock synchronizer module.

10. The system as claimed in claim 1, wherein a plurality of dynamic random-access memory integrated circuits or modules interfaces are embedded in the single integrated board, wherein a plurality of Double Data Rate Fourth Generation (DDR4) are connected with the single integrated circuit.

11. The system as claimed in claim 1, wherein the one or more interfaces is connected with the processing unit through the platform controller Hub (PCH) associated with the single integrated board.

12. A method to perform a set of functionalities associated with the CU and the DU, by the combined centralized and distributed unit (CCDU) system as claimed in claim 1.

13. A non-transitory computer readable medium comprising processor-executable instructions that cause a processor to perform a set of functionalities associated with the CU and the DU, by the combined centralized and distributed unit (CCDU) system as claimed in claim 1.

* * * * *